Aug. 30, 1932. E. O. BARSTOW ET AL 1,874,225
SYNTHESIS OF HYDROCHLORIC ACID
Filed Oct. 4, 1929
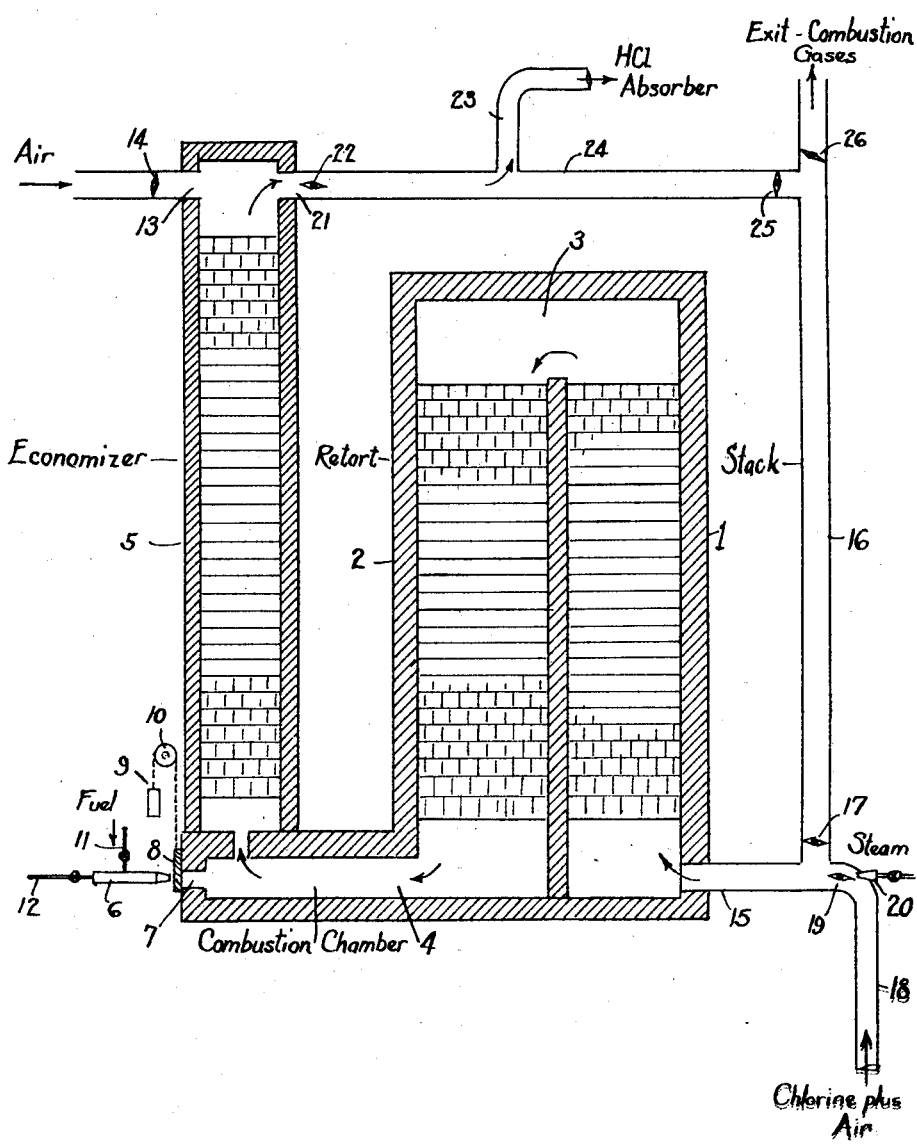
INVENTORS
Edwin O. Barstow and
BY Sheldon B. Heath
Thomas Griswold, Jr.
ATTORNEY

UNITED STATES PATENT OFFICE

EDWIN O. BARSTOW AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

SYNTHESIS OF HYDROCHLORIC ACID

Application filed October 4, 1929. Serial No. 397,197.

The present invention relates to the synthetic formation of hydrochloric acid by the reaction of chlorine and water vapor at an elevated temperature.

It has been established that the well known equation for the formation of chlorine by the oxidation of hydrochloric acid (Deacon process) represents a reversible reaction, which is expressed as the following:—

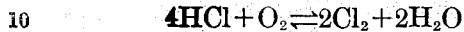

$$4HCl + O_2 \rightleftharpoons 2Cl_2 + 2H_2O$$

From the researches of various observers, particularly of Vogel van Falckenstein (Zeit. Phys. Chem. 59:313 (1907)), it has been determined that the above equation is equally balanced at a temperature of about 600° C., the equation representing the volumes of the respective components in equilibrium at that temperature. In other words, at such temperature the reaction velocity of the process directed to the right is exactly equal to that of the process directed to the left. At temperatures below 600° C. the reaction proceeding to the right predominates and the equilibrium becomes more favorable to the formation of chlorine by the oxidation of hydrochloric acid as in the Deacon process. On the other hand, at temperatures above 600° C., the equilibrium favors the formation of hydrochloric acid by reaction of chlorine and water vapor.

A large mass of data exists relative to the conditions involved in operating the Deacon process, but for the reverse process leading to the production of hydrochloric acid from chlorine and water in the temperature range above 600° C. there is an almost entire lack of definite or authoritative information. Beyond the mere statement that the reaction represented by the equation

$$2Cl_2 + 2H_2O \rightarrow 4HCl + O_2$$

takes place by passing chlorine and water vapor through a tube at "red heat", which term in general comprises an extreme temperature range of about 650° to 950° C., we are not aware that any description of such a process for the manufacture of hydrochloric acid is found in the literature. A modification thereof, it is true, in which carbon is introduced into the reaction for the purpose of combining with and removing oxygen has been the subject of extensive investigation and many patents have been issued describing variations of such modified process. However, it has not hitherto been proposed to produce hydrochloric acid in a commercially practicable way by subjecting a mixture of chlorine and water vapor, either alone or in the presence of air or oxygen, to a sufficiently elevated temperature whereat a high degree of conversion may be attained.

As a result of an extended investigation of the above reaction, we have now found that a material conversion of chlorine to hydrochloric acid in accordance with the above equation takes place at temperatures in excess of about 950° C., and that the conversion may be made substantially quantitative at a temperature between about 1400° C. and 1500° C. The reaction may be carried out in the presence of air or excess oxygen, even a large excess thereof, without materially affecting the degree of conversion. Other diluting gases may also be employed, such as the products of the combustion of fuel. For complete conversion, at least at temperatures below about 1500° C., it is essential that an excess of water vapor be employed. Water vapor may be introduced as such or may be formed wholly or in part in situ by introducing hydrogen accompanied by sufficient air or oxygen for the combustion thereof. Whether such hydrogen actually first forms water which in turn reacts with chlorine, or whether the hydrogen and chlorine react directly, is immaterial, since the result is the same in either case. The essential condition is that at least sufficient oxygen be present to combine with all such hydrogen, and, furthermore, that an excess of water vapor be either introduced into or formed in the reaction zone.

The reaction may be carried out either in an externally heated tube or retort, or the heat required to maintain a suitable reaction temperature may be supplied by contact with the interior walls of the retort or with a refractory packing in the retort which have been previously heated to a sufficiently high temperature by the combustion of fuel therein, or, again, the reacting gases may be admixed directly with such combustion gases. In the annexed drawing the single figure illustrates diagrammatically a form of apparatus adapted for the alternate heating of an interiorly packed retort and reaction therein of a mixture of chlorine and water vapor with or without the presence of air, oxygen or other diluting gas. In another application, Serial No. 397,252, filed of even date herewith, we have described an alternative form of procedure wherein the reaction temperature is maintained by the combustion of a carbonaceous fuel in dispersed condition in direct contact with the reacting mixture of chlorine and water vapor.

As an illustrative example indicating the degree of conversion of chlorine to hydrochloric acid attainable at a suitably elevated temperature the following experiment may be described.

A gaseous mixture of chlorine and air, containing 5.3 per cent chlorine by volume, was saturated with water vapor at a temperature of 54° C., and the resultant gaseous mixture was led through a quartz tube heated in an oil fired muffle furnace to a temperature of approximately 1160° C. The gas mixture contained an excess of 146 per cent by volume of water vapor over and above the amount thereof theoretically called for to react with all of the chlorine present. The time of contact of the gases in the heated zone was ⅓ minute. The effluent gases from the furnace were passed through a neutral standardized solution of potassium iodide, which was titrated with standard sodium thiosulphate solution for determining the residual chlorine content thereof, and then through a standardized sodium hydroxide solution for determining the acid content. A conversion of chlorine to hydrochloric acid amounting to 79.7 per cent of the theoretical was obtained. In this simple type of apparatus a higher temperature could not be employed due to the softening of the silica tube.

In another example a weak chlorine gas containing 8.16 per cent chlorine by volume was mixed with an approximately 200 per cent excess of water vapor, and the mixture introduced into a combustion chamber lined with refractory material and heated to a maximum temperature of approximately 1400° C. by direct contact with the hot gases from the combustion of fuel. In this experiment the reacting gases were intermixed with the heating gases. An average analysis of the stack gases on a dry basis was as follows;

|  | Per cent by volume |
|---|---|
| $CO_2$ | 9.6 |
| $O_2$ | 11.7 |
| $HCl$ | 16.3 |
| $Cl_2$ | 0. |

The conversion was accordingly 100 per cent.

The arrangement of apparatus shown in the drawing is particularly adapted for a mode of operation involving the direct reaction of chlorine and water vapor in a highly heated retort. Referring to the drawing, 1 and 2 are vertical retorts, constructed of heat resisting and retaining material, having a common partition wall, and provided with a refractory brick checker-work packing. Communication between the retorts is maintained through chamber 3. Opening from the lower end of retort 2 is a combustion chamber 4 which in turn communicates with a heat economizer tower 5 likewise filled with a brick checker-work. An atomizer or burner 6 for gaseous, liquid or powdered fuel is directed through opening 7 at one end of combustion chamber 4, opening 7 being closable by door 8 here shown as operated by a counterweighted cable 9 running over a pulley 10. Valved pipes 11 for fuel and 12 for steam or compressed air are connected to atomizer 6. Volume air for supporting combustion is admitted through inlet 13 to economizer 5, whence it is conveyed to combustion chamber 4, inlet 13 being regulated by valve 14. A conduit 15 connects the lower part of retort 1 with stack 16 for exit combustion gases, which is regulated by valve 17. An inlet pipe 18, regulated by valve 19, and connecting with conduit 15, is provided for introducing chlorine into retort 1, and a nozzle 20 projecting into pipe 18 provides for introducing steam thereto. From the top of economizer 5 an outlet passage 21, regulated by valve 22, is connected with pipe 23 leading to an absorption apparatus for hydrochloric acid gas not shown. A by-pass 24 connects stack 16 and pipe 23, valves 25 in by-pass 24 and 26 in stack 16 being provided for regulating the flow of gases therethrough.

In the operation of the above described apparatus, the brick checker-work packing in retorts 1 and 2 is heated to a suitably high temperature, e. g. 1400° to 1600° C., by the combustion of fuel atomized by burner 6 in combustion chamber 4, the furnace gases passing out through conduit 15 and stack 16 after having given up a portion of their heat to the checker-work. During the heating stage door 8 is open, likewise valves 14, 17 and 26, while valves 19, 22 and 25 are closed. When the retorts have been heated sufficiently hot, burner 6 is shut off, door 8 and valves 14, 17 and 26 closed, while valves 19 and 22 are opened. Chlorine, or a mixture of chlorine and air, is then admitted through pipe 18 and steam intermixed therewith through nozzle 20. The mixed gases and vapors pass through the hot brick checker-work of retorts 1 and 2 successively, being raised to a temperature whereat reaction occurs with the formation of gaseous hydrochloric acid. The reacted gaseous mixture containing hydrochloric acid, oxygen, nitrogen and excess water vapor, and being substantially free from chlorine if heated to a temperature in the vicinity of 1400° C. or higher, then is conducted through chamber 4 into economizer 5 wherein it surrenders a portion of its heat content to the brick checker-work, and finally passes out through exit passage 21 and pipe 23 to the hydrochloric acid absorption system. When the temperature in the retorts 1 and 2 has been reduced to the point that free chlorine can be detected in the exit gases, the supplies of chlorine and steam are discontinued, valves 19 and 22 are closed, and door 8 and valves 14 and 17 are opened. The supplies of fuel and atomizing steam or air to burner 6 are reopened and the vapors ignited in chamber 4. The volume air for combustion entering at 13 is preheated by the heat stored in economizer 5, thus facilitating the rapid reheating of the checker-work in retorts 1 and 2. Temporarily valve 25 is left open and valve 26 closed, so that the residual acid gases in the economizer and retorts may be swept out by the combustion gases and led via by-pass 24 and pipe 23 to the acid absorption system. When the gases passing through by-pass 24 are substantially free from hydrochloric acid, valve 25 is closed and valve 26 opened, so that the spent combustion gases then pass out the stack. After the checker-work in retorts 1 and 2 has been again heated to the desired temperature, the heating is discontinued as before, and the cycle of operations repeated as already described, operation being continuously maintained with periodical alternations of the heating and reacting stages of the process.

The hereindescribed mode of operation and the apparatus employed therefor may be variously modified, and numerous changes therein will occur to those versed in the art. It is not intended, therefore, that the foregoing description shall be construed as a limitation upon the invention which in its broad aspects comprises the direct reaction of chlorine and water vapor at temperatures above a red heat, i. e. above about 900° C. to 950° C. While in the temperature range between 600° and 900° C. the conversion of chlorine to hydrochloric acid takes place to a limited extent, nevertheless the equilibrium conditions in such range are satisfied while a relatively large proportion of free chlorine is still present. Consequently a process conducted within such temperature range cannot procure a complete conversion of chlorine to hydrochloric acid unless carbon in some form, or other substance capable of combining directly with oxygen, is likewise present. For commercial application the separation of unreacted chlorine from the hydrochloric acid product involves difficulties and added expense which may be entirely avoided by conducting the reaction at a temperature where substantially complete conversion may be achieved.

It is a further characteristic of the present improved process that it may be, and is preferably, carried out in the presence of air or an excess of oxygen above the quantity thereof formed in the principal reaction. Accordingly there is no necessity for employing a strong chlorine gas, inasmuch as a weak or dilute gas may be equally well utilized. The process, then, is well adapted for working up dilute mixtures of chlorine with air or other inert diluents which are obtained as a by-product in various chemical manufacturing industries, such as the dilute chlorine gas vented from the compressors in the usual processes for liquefying chlorine.

As already stated an excess of water vapor over the amount thereof required for the reaction is most advantageously to be employed, and, in fact, is essential if complete conversion is to be attained, at least at a temperature below about 1500° C. Such excess may be introduced as water or steam along with the chlorine or may, at least in part, be formed in situ by reaction between oxygen and hydrogen when the latter is intermixed with the reaction gases.

The process of the present invention is carried out without the material presence of carbon in the reaction zone, or if carbon or a carbonaceous or hydrocarbon material be employed as fuel for producing the heat required for the reaction, it is contemplated that sufficient air or oxygen will be supplied therewith to effect complete combustion. In other words, carbon is not employed in any form as a reducing agent for removing oxygen formed in the principal reaction between chlorine and water vapor. Under normal conditions the exit gases from the reaction will contain a material percentage of oxygen.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. A process of making hydrochloric acid which comprises intermixing chlorine with an excess of water vapor over that corresponding to the equation $$2Cl_2 + 2H_2O \rightarrow 4HCl + O_2,$$

heating the mixture to a temperature materially above 1000° C. but not exceeding about 1600° C. in the substantial absence of reducing substances and separating hydrochloric acid from the reacted gases.

2. A process of making hydrochloric acid which comprises introducing an air-chlorine mixture and an excess of water vapor over that corresponding to the equation

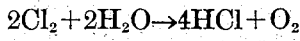

into a heated reaction zone to heat the gaseous mixture to a temperature materially above 1000° C. but not exceeding about 1600° C. in the substantial absence of reducing substances, withdrawing the reacted gases and separating hydrochloric acid therefrom.

3. A process of making hydrochloric acid which comprises alternately heating a pervious body of refractory packing material in a reaction chamber and then contacting therewith a mixture of air and chlorine with an excess of water vapor over that required to react with such chlorine to form hydrochloric acid, whereby to heat such gaseous mixture to a temperature preferably between 1400° and 1500° C., withdrawing the reacted gases and separating hydrochloric acid therefrom.

4. A process of making hydrochloric acid which comprises alternately heating a pervious body of refractory packing material in a reaction chamber by direct contact with hot combustion gases and then introducing a mixture of air and chlorine with an excess of water vapor over that required to react with such chlorine to form hydrochloric acid at such rate and in such volume that the gaseous mixture is heated to a temperature between 1400° and 1500° C., withdrawing and cooling the reacted gases, separating hydrochloric acid therefrom and preheating air supplied for the combustion of fuel to produce said combustion gases by passing such air through a zone previously heated by contact with the hot reaction gases.

Signed by us this 1st day of October, 1929.

EDWIN O. BARSTOW.
SHELDON B. HEATH.